United States Patent
Ryu et al.

(10) Patent No.: US 9,100,173 B2
(45) Date of Patent: Aug. 4, 2015

(54) SECURITY USB STORAGE MEDIUM GENERATION AND DECRYPTION METHOD, AND MEDIUM RECORDED WITH PROGRAM FOR GENERATING SECURITY USB STORAGE MEDIUM

(75) Inventors: Daegull Ryu, Seoul (KR); Secheol Oh, Seoul (KR)

(73) Assignee: MW STORY CO., LTD. (KR)

( * ) Notice: Subject to any disclaimer, the term of this patent is extended or adjusted under 35 U.S.C. 154(b) by 831 days.

(21) Appl. No.: 13/391,814

(22) PCT Filed: Aug. 20, 2010

(86) PCT No.: PCT/KR2010/005520
§ 371 (c)(1), (2), (4) Date: Feb. 22, 2012

(87) PCT Pub. No.: WO2011/025185
PCT Pub. Date: Mar. 3, 2011

(65) Prior Publication Data
US 2012/0151219 A1 Jun. 14, 2012

(30) Foreign Application Priority Data
Aug. 22, 2009 (KR) .......................... 10-2009-0077884

(51) Int. Cl.
*H04L 9/08* (2006.01)
*H04L 29/06* (2006.01)

(52) U.S. Cl.
CPC ................ *H04L 9/0863* (2013.01); *H04L 9/08* (2013.01); *H04L 9/083* (2013.01); *H04L 9/0897* (2013.01); *H04L 63/0428* (2013.01); *G06F 2213/0038* (2013.01); *H04L 2209/12* (2013.01)

(58) Field of Classification Search
CPC ..... H04L 9/0863; H04L 9/08; H04L 63/0428; H04L 9/0897; H04L 9/083; G06F 21/34
USPC ................................ 713/160, 176, 185, 193
See application file for complete search history.

(56) References Cited

U.S. PATENT DOCUMENTS

| 6,950,941 B1 * | 9/2005 | Lee et al. .................. 713/193 |
| 8,667,273 B1 * | 3/2014 | Billstrom et al. ............. 713/165 |

(Continued)

FOREIGN PATENT DOCUMENTS

| KR | 10-0348611 B1 | 8/2002 |
| KR | 10-0583050 B1 | 5/2006 |
| KR | 10-0703777 B1 | 4/2007 |

OTHER PUBLICATIONS

Hargreaves, Christopher, and Howard Chivers. "Recovery of encryption keys from memory using a linear scan." Availability, Reliability and Security, 2008. ARES 08. Third International Conference on. IEEE, 2008.*

(Continued)

*Primary Examiner* — Luu Pham
*Assistant Examiner* — Kari Schmidt

(57) ABSTRACT

Disclosed is a security USB storage medium generation and decryption method. The method comprises outputting information for requesting an input of a user password to be set through the output interface, generating a random key and a disk key based on first user password when the first user password is input from the input interface in response to the input requesting of the first user passwords, generating first encryption and decryption keys by hashing the first user password and the random key, when the random key and the disk key are generated, generating a security volume body part by classifying the storage region into a header and a body part using the first encryption and decryption keys, encrypting first data, storing the data in the header, generating a security volume header, encrypting second data using the disk key and then storing the data in the body part.

11 Claims, 6 Drawing Sheets

(56) References Cited

U.S. PATENT DOCUMENTS

| | | | |
|---|---|---|---|
| 2004/0184479 A1* | 9/2004 | Yamauchi et al. | 370/466 |
| 2004/0202323 A1* | 10/2004 | Fellerer | 380/44 |
| 2005/0081039 A1* | 4/2005 | Lee et al. | 713/176 |
| 2005/0114663 A1 | 5/2005 | Cornell et al. | |
| 2010/0185808 A1* | 7/2010 | Yu et al. | 711/103 |
| 2010/0228990 A1* | 9/2010 | Billings et al. | 713/185 |
| 2011/0113235 A1* | 5/2011 | Erickson | 713/152 |

OTHER PUBLICATIONS

Li MeiHong; Liu JiQiang, "USB key-based approach for software protection," Industrial Mechatronics and Automation, 2009. ICIMA 2009. International Conference on , vol., No., pp. 151,153, May 15-16, 2009.*

Snyder, Robin. "Some security alternatives for encrypting information on storage devices." Proceedings of the 3rd annual conference on Information security curriculum development. ACM, 2006.*

Bluzen Inc., "VXSAFE V1.0 Security Target V1.0.0.8", Jul. 3, 2009.

International Search Report and Written Opinion dated Apr. 27, 2011, corresponding to International Application No. PCT/KR2010/005520, filed Aug. 20, 2010.

Written Opinion of the International Searching Authority, dated Apr. 27, 2011, corresponding to International Application No. PCT/KR2010/005520, filed Aug. 20, 2010.

* cited by examiner

SECURITY USB STORAGE MEDIUM GENERATION AND DECRYPTION METHOD, AND MEDIUM RECORDED WITH PROGRAM FOR GENERATING SECURITY USB STORAGE MEDIUM

TECHNICAL FIELD

The present invention relates to a security USB (universal serial bus) storage medium generation and decryption method, and a medium recorded with a program for generating the security USB storage medium and, more particularly, to a method capable of generating a USB storage medium having security functions, enhancing access rights for the security USB storage medium, restoring and reusing a destroyed USB storage medium, and a medium recorded with the program for generating the security USB storage medium.

BACKGROUND ART

A USB storage medium, that can use required data anytime or anywhere, is a representative portable storage device. The USB storage medium is easy to carry and to use, and therefore, is widely used for storing files.

Since anyone may easily read and write the data in a USB storage medium in the related art, there is a risk that important data may be leaked. Therefore, although a USB storage medium enhanced with security functions has been launched, the launched USB storage medium has functions only blocking usage access of specific persons or has a problem that it is difficult to perfectly protect information from attacks such as a volume DUMP of hackers.

DISCLOSURE

Technical Problem

Accordingly, a first object of the present invention is to provide a method for generating a USB security volume allowing the content stored into a USB storage medium not to be read through a disk dump etc. when accessing the USB storage medium and a recording medium capable of being read by a computer performing the same method.

A second object of the present invention is to provide a method for destroying the security volume header of the security USB storage medium capable of blocking accessing a region stored with data, and therefore, enhancing the security thereof, when unduly accessing to read data stored in the USB storage medium set with the security.

A third object of the present invention is to provide a method for restoring a header of a destroyed security USB storage medium capable of reusing the destroyed USB storage medium when duly accessing the destroyed USB storage medium with the header.

Technical Solution

In order to accomplish the foregoing objects, according to an embodiment of the present invention, there is provided a method for generating a security USB storage medium by encrypting a USB storage medium including a USB interface, a storage region and a USB controller by a USB host unit including a USB connection port, an input interface, an output interface, a storage unit and a host controller, the method allows the host controller to perform: (a) outputting information requesting an input of a user password (which hereinafter, refers to a 'first user password') to be set through the output interface, when sensing that the USB connection port accesses the USB interface; (b) generating a random key and a disk key based on the input first user password, when the first user password is input from the input interface in response to the input requesting of the first user passwords; (c) generating encryption and decryption keys (which hereinafter, refers to 'first encryption and decryption keys') by hashing the first user password and the random key, when the random key and the disk key are generated; and (d) generating a security volume body part by classifying the storage region into a header and a body part using the first encryption and decryption keys, encrypting first data, storing the data in the header, generating a security volume header, encrypting second data using the disk key and then storing the data in the body part.

In the embodiment of the present invention, in (d) generating the security volume body part, the host controller encrypts the second data to be recorded in the body part assigned in the storage region of the USB storage medium by a sector as a unit using a sector I/O driver, and therefore, generates the security volume body part by storing the encrypted second data in the body part.

In the method for generating a security USB storage medium according to the embodiment of the present invention, the host controller transmits the predetermined first data including the random key and the disk key to the USB controller to store to the header assigned in the storage region of the USB storage medium.

In the embodiment of the present invention, the host controller encrypts data except for the random key among the first data to be stored in the header of the storage region by the USB controller, and transmits it to the USB controller.

In the embodiment of the present invention, in (a) outputting information requesting an input of user password, the host controller requests the input of access paths for the USB storage medium, or may output information requesting whether a quick format is present through the output interface.

In the embodiment of the present invention, the USB storage medium is a USB memory stick or a USB external hard drive. When the USB storage medium is a USB memory stick, a CD region loaded with the sector I/O driver is formed in the storage region of the USB storage medium, and when the first data are input and output to the body part of the storage region, the first data are encrypted and decrypted by the sector I/O driver.

In the embodiment of the present invention, in (a) outputting information requesting the input of user password, the host controller mounts the sector I/O driver in the storage unit prior to the input requesting of the first user password. Therefore, when the first data are input and output to the body part of the storage region, the first data is encrypted and decrypted by the sector I/O driver mounted in the storage unit.

In order to accomplish the foregoing objects, according to another embodiment of the present invention, there is provided a method for mounting a security USB storage medium generated by the present invention, the method allows the host controller to perform: outputting information requesting an input of a user password (which hereinafter, refers to a 'second user password') through an output interface, when sensing that a USB connection port accesses a USB interface; generating keys (which hereinafter, refers to 'second encryption and decryption keys') for encrypting and decrypting the security volume header using the input second user password and the random key stored in the security volume header, when the second user password is input from an input interface; decrypting the security volume header using the generated second encryption and decryption keys; and extracting the disk key stored in the security volume header and mounting the extracted disk key in the security volume body part, when the security volume header is normally decrypted.

In order to accomplish the foregoing objects, according to yet another embodiment of the present invention, there is provided a method for destroying a security volume of a security USB storage medium generated by the present invention, the method allows the host controller to perform: outputting information requesting an input of a user password (hereinafter, refers to a 'third user password') through an output interface, when sensing that a USB connection port accesses a USB interface; generating keys (hereinafter, refers to 'third encryption and decryption keys') for encrypting and decrypting the security volume header using the input third user password and the random key stored in the security volume header, when the third user password is input from an input interface; decrypting the security volume header using the generated third encryption and decryption keys; and overwriting the random values on the second data recorded in the security volume body part, when the security volume header is not normally decrypted.

In order to accomplish the foregoing objects, according to still another embodiment of the present invention, there is provided a method for destroying a security volume header of a security USB storage medium generated by the present invention, the method allows the host controller to perform: outputting information requesting an input of a user password (which hereinafter, refers to a 'third user password') through an output interface, when sensing that a USB connection port accesses a USB interface; generating keys (which hereinafter, refers to 'third encryption and decryption keys') for encrypting and decrypting the security volume header using the input third user password and the random key stored in the security volume header, when the third user password is input from an input interface; decrypting the security volume header using the generated third encryption and decryption keys; and resetting the first data stored in the security volume header with the random data, when the security volume header is not normally decrypted.

In order to accomplish the foregoing objects, according to yet still another embodiment of the present invention, there is provided a method for restoring a security volume header of a security USB storage medium when a security volume header of a security USB storage medium generated by the method of claim 4 is destroyed, the method allows the host controller to perform: determining whether information for the restoring request of the security volume header of the security USB storage medium is received through an input interface, when sensing that a USB connecting port accesses a USB interface; searching the security volume header of the security USB storage medium to be restored according to the restoring request from a storage unit, when the information for the restoring request of the security volume header of the security USB storage medium is received; outputting information requesting an input of user password (which hereinafter, refers to a 'fourth user password') through an output interface, when the security volume header of the security USB storage medium to be restored is searched; generating keys (which hereinafter, refers to 'fourth encryption and decryption keys') for encrypting and decrypting the security volume header using the input fourth user password and the random key stored in the security volume header stored in the storage unit, when the fourth user password is input from the input interface; decrypting the security volume header using the generated fourth encryption and decryption keys; and recording the predetermined first data stored in the security volume header of the decrypted security USB storage medium in the security volume header of the destroyed security USB storage medium, when the security volume header is normally decrypted.

Advantageous Effects

According to the present invention, some region of the header and a body part among the storage region of the USB storage medium is encrypted and decrypted by a sector as a unit using an encryption algorithm, the encryption and decryption keys capable of accessing the encrypted body part are stored in the encrypted header region, and therefore, the content stored in the USB storage medium through a disk dump etc. may not be read when a user password that is input on generating the security volume is not input, thereby to enhance the security of the USB storage medium.

In addition, according to the present invention, when unauthorized persons such as a person stealing a secured USB storage medium access the security volume body part stored with data, if a password different from the user password input to generate an initial security volume is input, the security volume header is reset with random data, such that a key capable of accessing the security volume body part may not be extracted, thereby to prevent outflow of data stored in the USB storage medium when losing the USB storage medium.

Further, according to the present invention, when the security volume header of the USB storage medium is destroyed, information of the security volume header stored in the USB host unit or the external storage apparatus is recorded in the destroyed security volume header as it is to restore the destroyed security volume header, thereby to reuse the USB storage medium destroyed by a legitimate user.

DESCRIPTION OF DRAWINGS

These and other objects, features, aspects, and advantages of the present invention will be more fully described in the following detailed description of preferred embodiments and examples, taken in conjunction with the accompanying drawings. In the drawings.

BEST MODE

Figure 1:
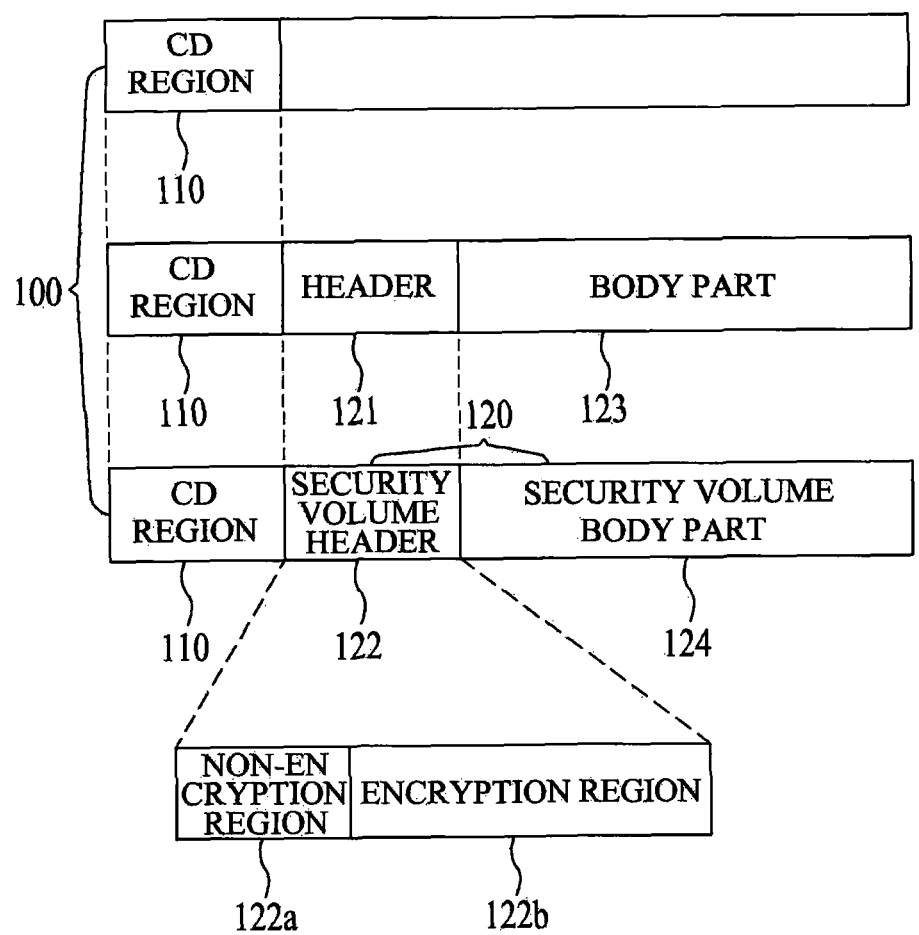
FIG. 1 is a schematic view showing an example of generating a security volume for a storage region during a security USB storage medium generating process according to an embodiment of the present invention.

The present invention will now be described more fully hereinafter with reference to the accompanying drawings forming a part of this specification wherein like reference characters designate corresponding parts in the several views. In the embodiments of the present invention, detailed description of the publicly known functions and configurations that are judged to be able to make the purport of the present invention unnecessarily obscure are omitted.

FIG. 1 is a schematic view showing an example of generating a security volume for a storage region during a security USB storage medium generating process according to an embodiment of the present invention.

In the present invention, the USB storage medium provided with the storage region 100, which means all storage apparatus provided with an interface, includes an external hard drive included with a USB interface. However, in the external hard drive, in general, a CD region is not separately formed, and therefore, the security volume generation method below may be varied a little according to features of each of the USB storage medium.

Referring to FIG. 1, in the storage region 100 of the security USB storage medium of the present invention, a CD region 110 is formed when manufacturing the USB storage medium.

The CD region 110, which stores data without causing deformation, may auto-play upon loading for automatically playing stored data in the state allowing the USB storage medium to access the USB host unit. Further, the CD region 110 is loaded with an agent program performing predetermined functions for generating the security USB storage medium and a sector I/O driver for encrypting and decrypting the storage region 100 by the sector as a unit. At this time, the sector I/O driver should also be mounted in the USB host unit. In the USB storage medium not having a separate CD region 110, the agent program or the sector I/O driver may be mounted in the USB host unit.

In the present invention, 'the USB host unit', which means an ordinary computer, refers to all electronic apparatuses such as a PC, a server computer, a PDA or a cellular phone, a smartphone, a game console, and an IPTV set up box included with a USB connecting port accessing the USB storage medium and communicating with each other.

The storage region 100 of the USB storage medium includes the CD region 110 loaded with the agent program, and a data storage region 120. Next, the data storage region 120 is classified into a header 121 and a body part 123 by the agent program, and the header 121 and the body part 123 are transformed into a security volume region. The security volume region is deformed into a security volume header 122 and a security volume body part 124 corresponding to the header 121 and the body part 123, respectively. At this time, the security volume header 122 is classified into a non-encryption region 122a and an encryption region 122b.

In the present invention, the agent program may access the security volume body part 124 using encryption and decryption keys stored in the security volume header 122, and directly performs a security volume mounting, disabling of the security volume decryption and destroying operation of the security volume to be described later.

The sector I/O driver inputs and outputs the data stored in the security volume body part 124 and may encrypt and decrypt each sector. That is, the sector I/O driver, when storing specific files, encrypts the sector to be stored with the files, stores the encrypted sector data, decrypts by the sector as a unit when reading the sector corresponding to the specific files, forms the sector data without encrypting, and displays the formed sector data on the screen.

Therefore, since the writing and reading operations for each sector for the specific data and the encryption and decryption are performed at the same time by the sector I/O driver, it is possible to drastically reduce time required for the encryption and decryption of the data.

Prior to generating the security volume, the data storage region 120 is a file system having a general O/S. When the security volume is generated, the security volume is classified into the security volume body part 124 corresponding to the file system for storing the files etc., and the security volume header 122 for storing the predetermined information.

The non-encryption region 122a of the security volume header 122 is stored with a random key, that is, a salt key, and the encryption region 122b is stored with other various information and data. For example, the encryption region 122b may be stored with version information of the security volume header 122, the version information of the agent program, security volume generating time, medium management numbers, size information of the security volume body part 124, a disk key for encrypting and decrypting the security volume body part 124, etc.

In case of the USB storage medium not formed with the CD region 110 in the storage region 100, the security volume header 122 may be stored with signature values for checking whether it corresponds to the security volume header 122. The signature values provided by the agent program mounted in the USB host unit are eigen values of each of the USB storage medium, and therefore, may be usefully used when mounting the security volume to be described later.

Figure 2:
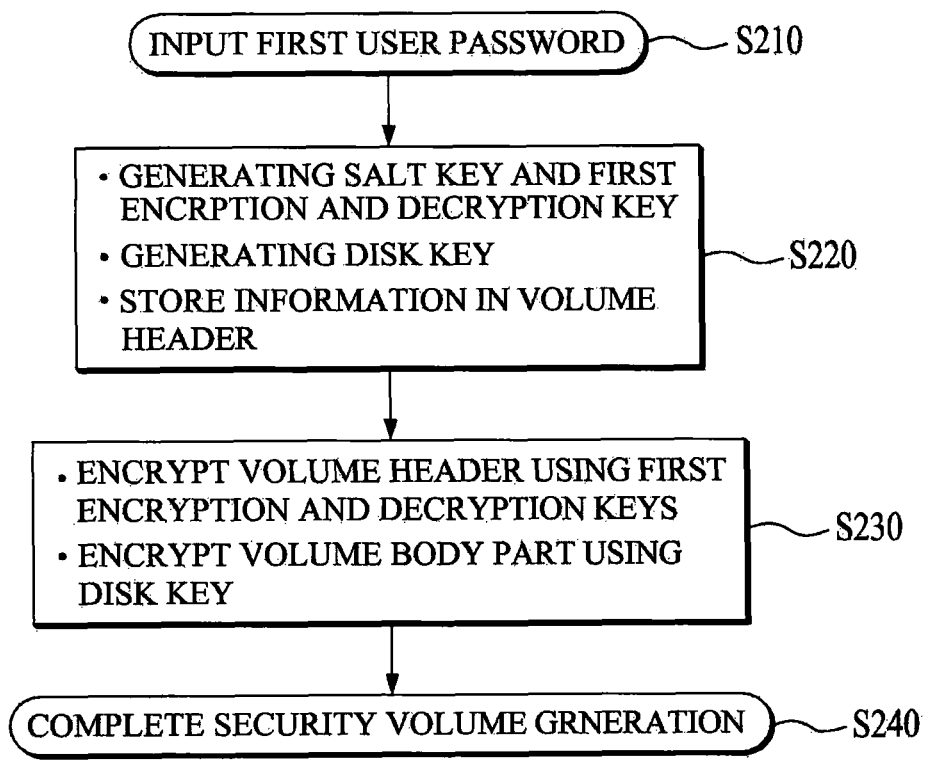
FIG. 2 is a flow chart for explaining a security volume generating method according to an embodiment of the present invention.

The storage region 100 of the USB storage medium is generated with the agent program performing the specific function and the security volumes 122 and 124 encrypted and decrypted by the sector as a unit using the sector I/O driver etc. according to the present invention. Hereinafter, a security volume generating method according to the embodiment of the present invention will be described with reference to FIG. 2. FIG. 2 is a flow chart for explaining the security volume generating method according to an embodiment of the present invention.

First, the agent program and the sector I/O driver should be loaded in the CD region 110 or mounted in the USB host unit to generate the security volumes 122 and 124. Although the CD region 110 is loaded with the agent program, a more powerful agent program may be mounted in the USB host unit. In this case, it is preferable that the agent program mounted in the USB host unit is operated in preference to the agent program mounted in the CD region 110.

Referring to FIG. 2, the agent program requests an input of a user password (which hereinafter, refers to a 'first user password' to distinguish it from the user password input during other process) for setting the security in the storage region 100 for a user (S210). At this time, the agent program requests the input for an access path of the USB storage medium to the user or may request for checking, as to whether the USB storage medium is quickly formatted or generally formatted, to the user.

When the first user password is input from the user, the agent program generates the random key, that is, the salt key using a random generator (S220). Here, the salt key generates the encryption and decryption keys for encrypting and decrypting the header 121 of the storage region 100.

Further, when the first user password is input, the agent program generates the disk key for encrypting the body part 123 of the storage region 100 or decrypting the encrypted security volume body part 124 (S220).

Next, the agent program generates the input first user password, and the encryption and decryption keys (which hereinafter, refers to 'first encryption and decryption keys' to distinguish them from the encryption and decryption keys to be generated during the mounting process hereafter) for encrypting and decrypting the header 121 of the storage region 100 by repeatedly performing a hashing algorithm such as SHA1, AHA512, RIPEMD160, WHIRLPOOL for the salt key (S220).

The generated salt key and the disk key are stored in the header 121 in step S220, and in addition, already mentioned predetermined information is stored in the header 121.

Next, the header 121 is encrypted using the first encryption and decryption keys generated in step S220 and an encryption algorithm. At this time, the salt key is hashed with the user password to be input whenever the user wants to access the USB storage medium, and decrypts the encrypted security volume header 122 and therefore, should be stored in the non-encryption region 122a. That is, the agent program encrypts the data stored in the encryption region 122b of the volume header 122 except the salt key (S230).

Further, the agent program may format and encrypt the body part 123 (file system) for storing the file etc. in step S220. At this time, when a quick format is selected in the first user encryption input step of step S210, random data are encrypted by performing a quick format, and when a quick format is not selected, a general format for encrypting random data for all of the sector of the file system and recording the encrypted data is performed. The encryption process through the format is performed using the generated disk key and the encryption algorithm. The encryption process is performed by the sector as a unit using the sector I/O driver of the present invention.

In the above process, the security volume header 122 encrypted with a predetermined region (the encryption region 122b) and the security volume body part 124 encrypted with the entire data are generated (S240).

The generated security volume header 122 is stored in the USB host unit or a separate server (an external storage medium) and then, may be used when restoring the security volume header 122.

Figure 3:
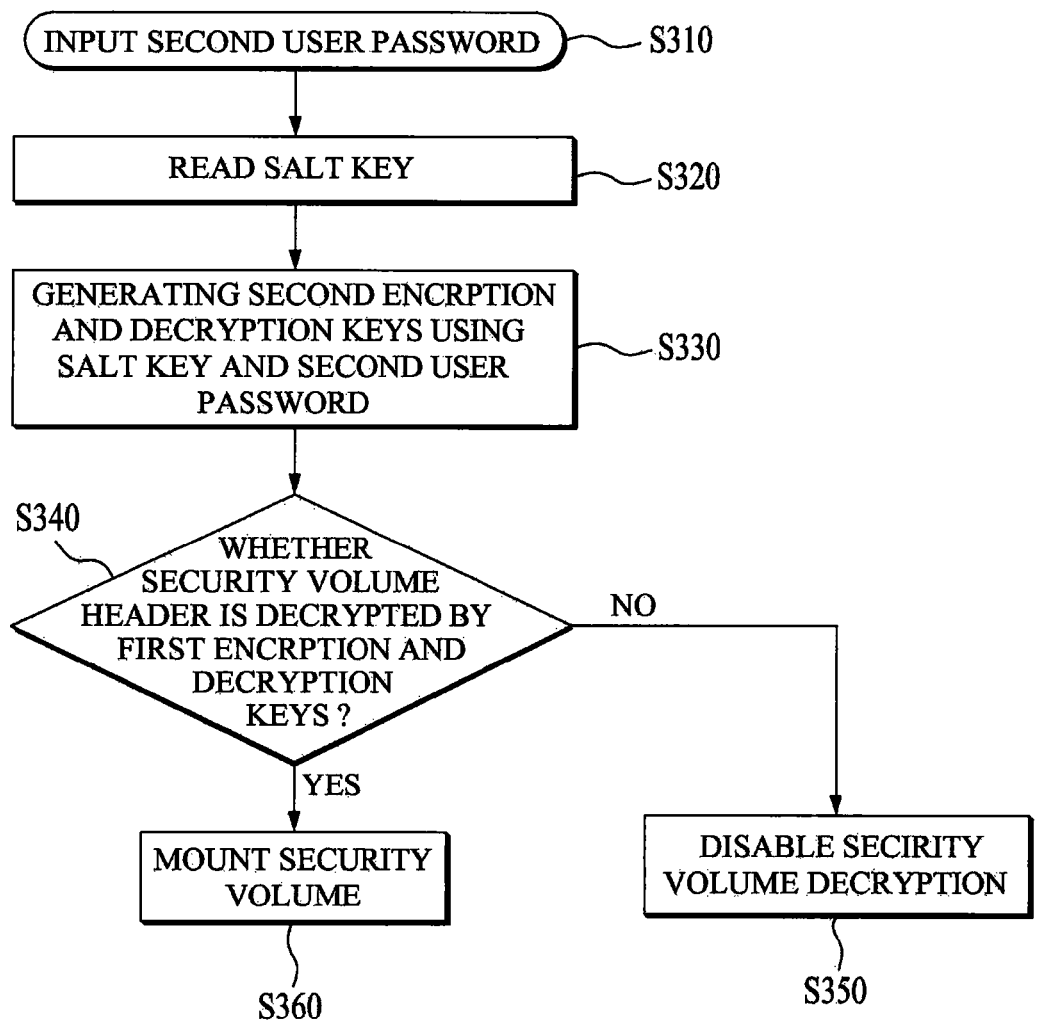
FIG. 3 is a view for explaining a security volume mounting method according to an embodiment of the present invention.

Hereinafter, in above process, a method for mounting the encrypted security volume and implementing I/O is described with reference to FIG. 3. FIG. 3 is a view for explaining a security volume mounting method according to the embodiment of the present invention. Here, the security volume mounting refers to a series of processes for decrypting the security volume header 122, extracting the decrypted data, and identifying information stored in the security volume body part 124 of an operating system of the USB host unit.

Referring to FIG. 3, when the security USB storage medium accesses the USB host unit, the agent program requests the input of the user password (which hereinafter, refers to a 'second user password') to the user (S310).

When the second user password is input, the agent program reads the salt key stored in the non-encryption region 122a of the security volume header 122 (S320), hashes with the input second user password, and generates the encryption and decryption key (which hereinafter, refers to 'second encryption and decryption keys') for the security volume header 122.

Next, the agent program decrypts the encryption region 122b of the security volume header 122 by the second encryption and decryption keys generated in step S330 (S340). At this time, when the encryption region 122b of the security volume header 122 is not decrypted by the second encryption and decryption keys, reaffirmation of the user password (a second user password) is requested, and the step S320 and step S340 are repeated using the user password that is input again. This process may be allowed to occur a predetermined number of times. Even after requesting the reaffirmation, when the encryption region 122b of the security volume header 122 is not decrypted by the input second encryption and decryption keys, the decryption of the security volumes 122 and 124 is disabled (S350).

On the other hand, when the input second user password is the same as the first user password set in step S210 of FIG. 2 and the encryption region 122b of the security volume header 122 is decrypted by the second encryption and decryption keys generated in step S330, the agent program extracts the disk key from the encryption region 122b of the security volume header 122 and mounts the security volume body part 124 (S360). Furthermore, the agent program decrypts the encrypted data of the security volume body part 124 by use of the encryption algorithm and the disk key. At this time, when decrypting the encrypted data, the decryption while having sector numbers by the sector as a unit is performed, and input and output are performed by the sector as a unit through an I/O driver.

On the other hand, when the CD region 110 is not generated separately, the agent program is mounted in the USB host unit, and therefore, when the security volumes 122 and 124 are generated, the signature values are stored in the security volume header 122. As described above, the signature values, which is an eigen value assigned differently for each USB storage medium when distributing the agent program, prevents the security USB storage medium from operating in the program except the corresponding agent program.

When the signature values are stored in the security volume header 122, after the security volume header 122 is decrypted by the second encryption and decryption keys, the process of checking whether the signature values are the same is proceeded. When the signature value stored in the agent program and the signature value within the security volume header 122 are the same, it is possible to mount the security volume body part 124, but when these signature values are not the same, it is impossible to mount the security volume body part 124.

On the other hand, as described above, when the security USB storage medium generated with the security volumes 122 and 124 is abnormally carried out, stolen or lost, it is necessary to enhance the security to prevent the outflow of the file within the security USB storage medium. To this end, it is possible to destroy the security volumes 122 and 124 or the security volume header 122.

When un-authorized persons try to access the USB host unit by the security USB storage medium, the input of the user password (which hereinafter, refers to a 'third user password') is requested from the agent program.

When the third user password is input, the agent program reads the salt key stored in the non-encryption region 122a of the security volume header 122 of the security USB storage medium, hashes the input third user password and hashing algorithm, and generates the encryption and decryption keys (which hereinafter, refers to 'third encryption and decryption keys') for decrypting the encryption region 122b of the security volume header 122. The encryption region 122b of the security volume header 122 is decrypted by the generated third encryption and decryption keys. At this time, when not normally decrypted, it means that the third user password is not the same as the input first user password in step S210 of FIG. 2, and therefore, opportunities for inputting the third user password are further given by a predetermined the number of times. Although the third user password is input the predetermined the number of times, when the encryption region 122b of the security volume header 122 is not decrypted, the security volumes 122 and 124 and the security volume header 122 are destroyed.

The method of destroying the security volumes 122 and 124 overwrites the data with random data, that is, writes random values on the data stored in the security volumes 122 and 124. Like this, when overwriting with the random values, the security volumes 122 and 124 become unrestorable.

The method for destroying the security volume header 122 is that only the data of the security volume header 122 is reset with the random data. That is, the agent program generates random data corresponding to the size of the security volume header 122, resets it with meaningless data, and therefore, destroys the security volume header 122.

Like this, when the security volume header 122 is reset with the meaningless data, since it is completely impossible to call the disk key stored in the security volume header 122, the access itself for the security volume body part 124 is impossible. Thus, an unauthorized user may not read/write the file stored in the security volume body part 124 of the security USB storage medium, and therefore, it is possible to maintain the security thereof.

Figure 4:
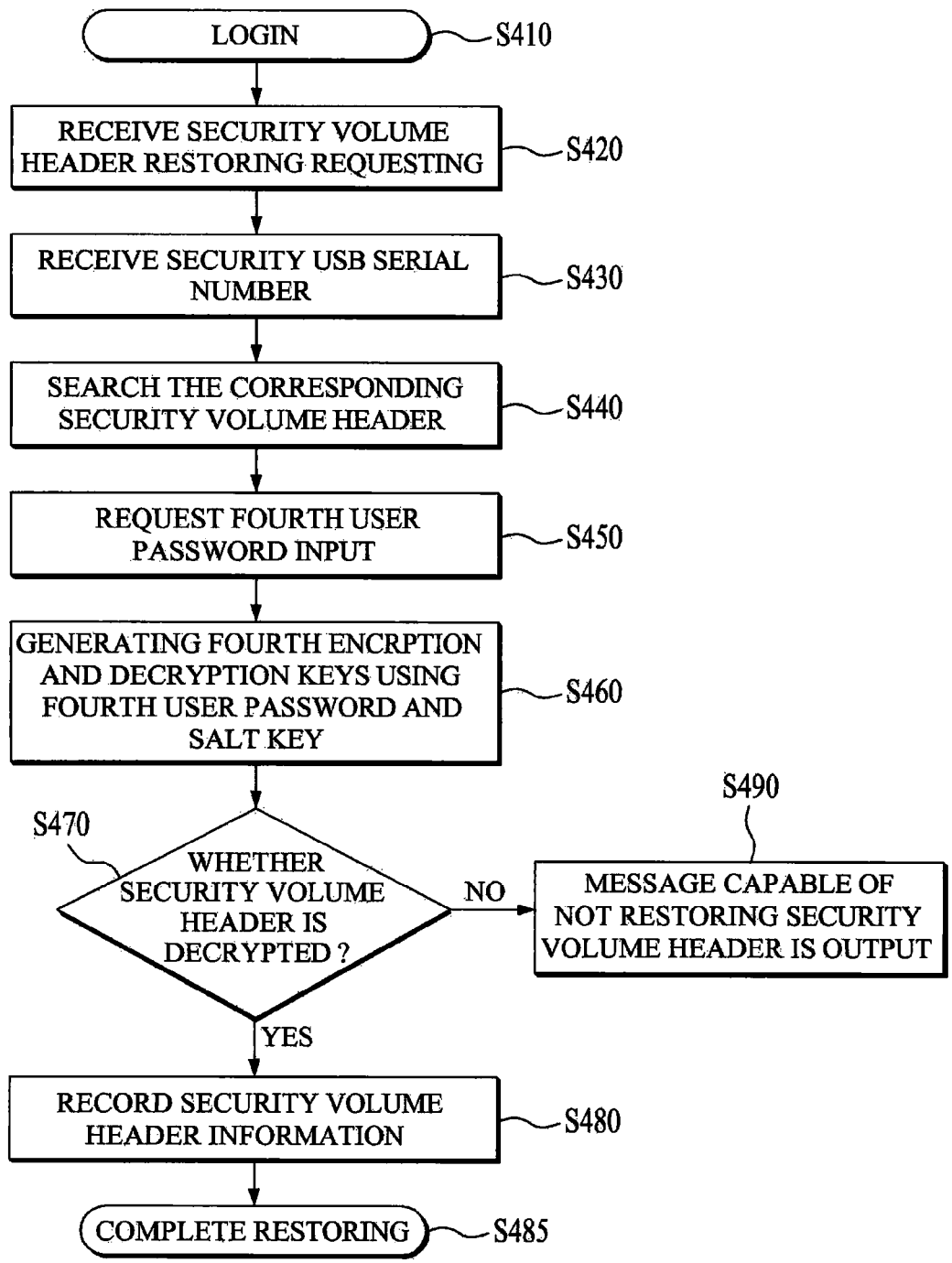
FIG. 4 is a flow chart for explaining a security volume header restoring method according to an embodiment of the present invention.

After destroying the security volume header 122 of the security USB storage medium 100 to enhance security, when a legitimate user obtains the security USB storage medium 100, the legitimate user must be able to access the security volume body part 124. As a result, it is preferable that the legitimate user restores the destroyed security volume header 122 and reuses the restored header. Referring to FIG. 4, the process of restoring the security volume header 122 will be described. FIG. 4 is a flow chart for explaining a security volume header restoring method according to the embodiment of the present invention.

As described above for generating the security volumes 122 and 124, when the data stored in the generated security volume header 122 is stored in the USB host unit or a specific security server or a separate safe storage apparatus of the legitimate user, the user may restore the destroyed security volume header 122 using the data stored therein.

Referring to FIG. 4, when the data stored in the security volume header 122 is stored in a separate safe sever, if the security USB storage medium accesses the sever etc. through the USB host unit, the agent program mounted in the server requests a login to the user (S410), it is determined whether the restoring request of the security volume header is received from a user who is logged in.

When the restoring request of the security volume header is received from the user (S420), the agent program requests the input of the security USB serial number to the user.

In response to the request, when the user inputs a serial number (S430), the agent program searches the corresponding security volume header using the input serial number (S440).

When the corresponding security volume header is searched, the agent program requests the input of the user password (which hereinafter, refers to a 'fourth user password') to the user.

The encryption and decryption keys (which hereinafter, refers to 'fourth encryption and decryption keys') for encrypting and decrypting the security volume header are generated by hashing the input fourth user password and the salt key stored in the header storage device (S460).

The security volume header is decrypted using the generated fourth encryption and decryption keys, thereby to determine whether it is normally decrypted (S470). Thus, when the security volume header is normally decrypted, since it means that the input fourth user password is the same as the first user password input in step S210 of FIG. 2, the security volume header information within the security volume header storage apparatus is read out and overwrites the destroyed security volume header 122 (S480), and restores the security volume header 122 (S485).

On the other hand, when the security volume header is not decrypted using the fourth encryption and decryption keys in step S470, since it means that the fourth user password is not the same as the first user password input in step S210 of FIG. 2, a message, that it is not possible to restore the security volume header 122, is output (S490). When the message is output, the user again repeats steps S450 to S490 described above. Although such a repetition process is performed a predetermined number of times, it is desirable to limit this to 3 to 5 times for security reasons.

Figure 5:
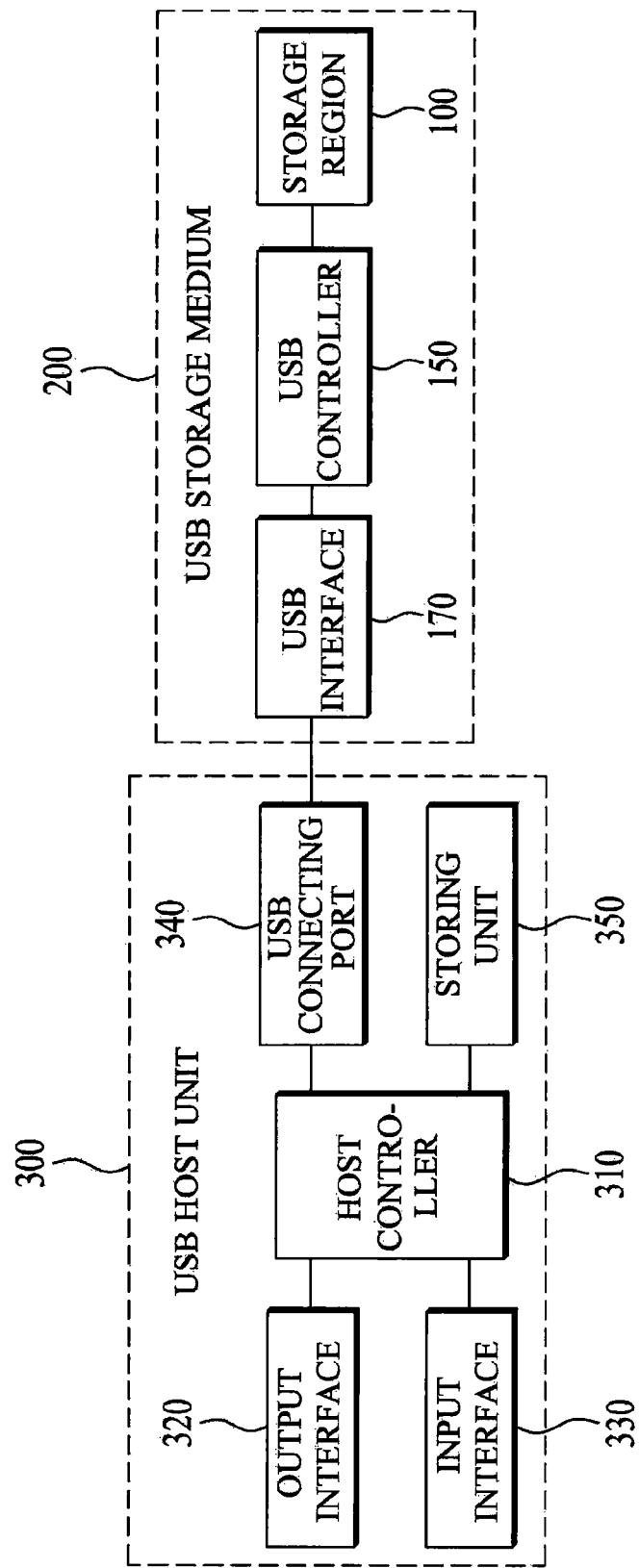
FIG. 5 is a block diagram for configurations of a system that implements an agent program for security volume generation and mounting, and security volume header restoration according to the embodiment of the present invention by hardware.

FIG. 5 is a block diagram for configurations of a system that implements an algorithm, by hardware, for security volume generation and mounting, and the restoring of the security volume header for the USB storage medium performed by the agent program in FIGS. 1 to 4 according to the embodiment of the present invention.

As shown, the system of the present invention includes a USB storage medium 200 and a USB host unit 300.

The USB storage medium 200 includes a storage region 100, a USB controller 150 and a USB interface 170. The storage region 100 is the region storing, encrypting and decrypting data shown in FIG. 1, the USB controller 150 controls the input and output (reading/writing) of the data for the storage region 100, and the USB interface 170 is a bus for accessing the USB host unit 300 to transmit the data.

The USB host unit 300 includes a host controller 310, an output interface 320, an input interface 330, a USB connecting port 340 and a storing unit 350. The host controller 310, which implements in hardware in correspondence to the agent program of the present invention, encrypts and decrypts the USB storage medium according to the embodiment of the present invention. The output interface 320 is a display unit for displaying information according to control of the host controller 310, and the input interface 330 is an input apparatus inputting information by user. The USB connecting port 340 is a bus accessing the USB storage medium 200 to input and output data, and the storing unit 350 is a medium storing programs required for operating the USB host unit 300 and the data.

Hereinafter, the process, which encrypts the USB storage medium 200 and converts the encrypted USB storage medium 200 into the security USB storage medium through the USB host unit 300 configured as described above, will be described.

The host controller 310 senses whether the USB connecting port 340 accesses the USB interface 170 provided in the USB storage medium 200. When the USB host unit 300 is operating, if the USB interface 170 accesses the USB connecting port 340, power is supplied from the USB host unit 300 to the USB interface 170 through the USB connecting port 340. Therefore, the USB controller 150 drives the USB storage medium 200 using the power supplied thereto.

If the host controller 310 senses whether the USB connecting port 340 accesses the USB interface 170, information requesting the input of the first user password to be set thereto is output to generate the security USB storage medium through the output interface 320. At this time, the host controller 310 requests input of an access path for the USB storage medium 200, or may also output information requesting whether a quick format is present through the output interface 320.

In response, when the user inputs the first user password through the input interface 330, the host controller 310 generates the random key and the disk key based on the input first user password.

When the random key and the disk key are generated based on the first user password, the host controller 310 generates the first encryption and decryption keys by hashing the first user password and the random key.

Hereinafter, the host controller 310 classifies the storage region 100 into the header 121 and the body part 123 using the first encryption and decryption keys, encrypts the first data, stores the encrypted first data in the header 121, and generates the security volume header 122. Further, the host controller 310 encrypts the second data using the disk key, stores the encrypted data in the body part 123, and generates the security volume body part 124.

At this time, when generating the security volume body part 124, the host controller 310 encrypts the second data to be recorded in the body part 123 assigned in the storage region 100 of the USB storage medium 200 by a sector as a unit using a sector I/O driver, and therefore, generates the security volume body part 124 by storing the encrypted second data in the body part 123.

Further, the host controller 310 transmits the predetermined first data including the random key and the disk key to the USB controller 150 to store the header 121 assigned in the storage region 100 of the USB storage medium 200. At this time, the host controller 310 encrypts data except the random key among the first data to be stored in the header 121 of the storage region 100 by the USB controller 150, and transmits it to the USB controller 150. Therefore, the USB controller 150 stores the first data transmitted from the host controller 310 through the USB connecting port 340 and the USB interface 170 in the header 121 of the storage region 100.

In the present invention, an example of the USB storage medium 200 is a USB memory stick or an external hard drive. In the present invention, when the USB storage medium 200 is a USB memory stick, the CD region 110 loaded with the sector I/O driver is formed in the storage region 100 of the USB storage medium 200. In this case, when the first data are input and output to the body part 123 of the storage region 100, the first data is encrypted and decrypted by the sector I/O driver.

In the present invention, the host controller 310 may dispose the sector I/O driver in the storage unit 350, prior to the request of the first user password input. In this case, when the first data are input and output to the body part 123 of the storage region 100, the first data is encrypted and decrypted by the sector I/O driver mounted in the storage unit 350.

The host controller 310 may store the first data included in the generated security volume header 122 in the storage unit 350 and the external storage apparatus. In this case, the host controller 310 may restore encrypted first data stored in the security volume header 122 using stored data.

On the other hand, hereinafter, a method of mounting the security USB storage medium generated in the present invention will be described.

If the host controller 310 senses whether the USB connecting port 340 accesses the USB interface 170, the information requesting the input of the second user password is output through the output interface 320. In response, when the second user password is input from the input interface 330, the host controller 310 generates the second encryption and decryption keys for encrypting and decrypting the security volume header 122 using the input second user password and the random key stored in the security volume header 122.

The host controller 310 decrypts the security volume header 122 using the second encryption and decryption keys generated hereat. Hereat, when the security volume header 122 is normally decrypted, the host controller 310 extracts the disk key stored in the security volume header 122 and mounts the extracted disk key in the security volume body part 124.

In the present embodiment, to mount the security volume body part 124 means that the host controller 310 decrypts the specific sector for the security volume body part 124 or the second data stored in the entire sector through the sector I/O driver.

Hereinafter, a method of destroying the security volume of the security USB storage medium generated in the present invention will be described.

If the host controller 310 senses whether the USB connecting port 340 accesses the USB interface 170, the information requesting the input of the third user password is output through the output interface 320. In response, when the third user password is input from the input interface 330, the host controller 310 generates the third encryption and decryption keys for encrypting and decrypting the security volume header 122 using the input third user password and the random key stored in the security volume header 122.

The host controller 310 decrypts the security volume header 122 using the third encryption and decryption keys generated hereat. Hereat, when the security volume header 122 is not normally decrypted, the host controller 310 overwrites the random values on the second data recorded in the security volume body part 124.

Hereinafter, a method of destroying the security volume header of the security USB storage medium generated in the present invention will be described.

If the host controller 310 senses whether the USB connecting port 340 accesses the USB interface 170, the information requesting the input of the third user password is output through the output interface 320. In response, when the third user password is input from the input interface 330, the host controller 310 generates the third encryption and decryption keys for encrypting and decrypting the security volume header 122 using the input third user password and the random key stored in the security volume header 122.

The host controller 310 decrypts the security volume header 122 using the third encryption and decryption keys generated hereat. Hereat, when the security volume header 122 is not normally decrypted, the host controller 310 resets the first data stored in the security volume header 122 with the random data.

Hereinafter, a method of restoring the security volume header 122 of the destroyed USB storage medium by the security volume header 122 of the security USB storage medium generated in the present invention will be described.

The host controller 310 senses whether the USB connecting port 340 accesses the USB interface 170, and determines whether information for the restoring request of the security volume header 122 of the security USB storage medium is received through the output interface 320. In response, when the information for the restoring request of the security volume header of the security USB storage medium is received, the host controller 310 searches the security volume header 122 of the security USB storage medium to be restored according to the restoring request from the storage unit 350 or the external storage apparatus.

When the security volume header 122 of the security USB storage medium to be restored is searched, the host controller 310 outputs information requesting the input of the fourth user password through the output interface 320. In response, when the fourth user password is input from the input interface 330, the host controller 310 generates the fourth encryption and decryption keys for encrypting and decrypting the security volume header 122 using the input fourth user password and the random key stored in the security volume header 122 of the security USB storage medium stored in the storage unit 350 or the external storage apparatus.

The host controller 310 decrypts the security volume header 122 using the fourth encryption and decryption keys generated hereat. Hereat, when the security volume header 122 is normally decrypted, the host controller 310 records the predetermined first data stored in the security volume header 122 of the decrypted security USB storage medium stored in the storage unit 350 or the external storage apparatus in the security volume header 122 of the destroyed security USB storage medium.

On the other hand, the I/O driver for encrypting and decrypting data in the embodiment of the present invention may be included in the USB host unit 300 or the USB storage medium 200 in software, and may be loaded in the USB host unit 300 or the USB storage medium 200 by modulating in hardware.

Figure 6:
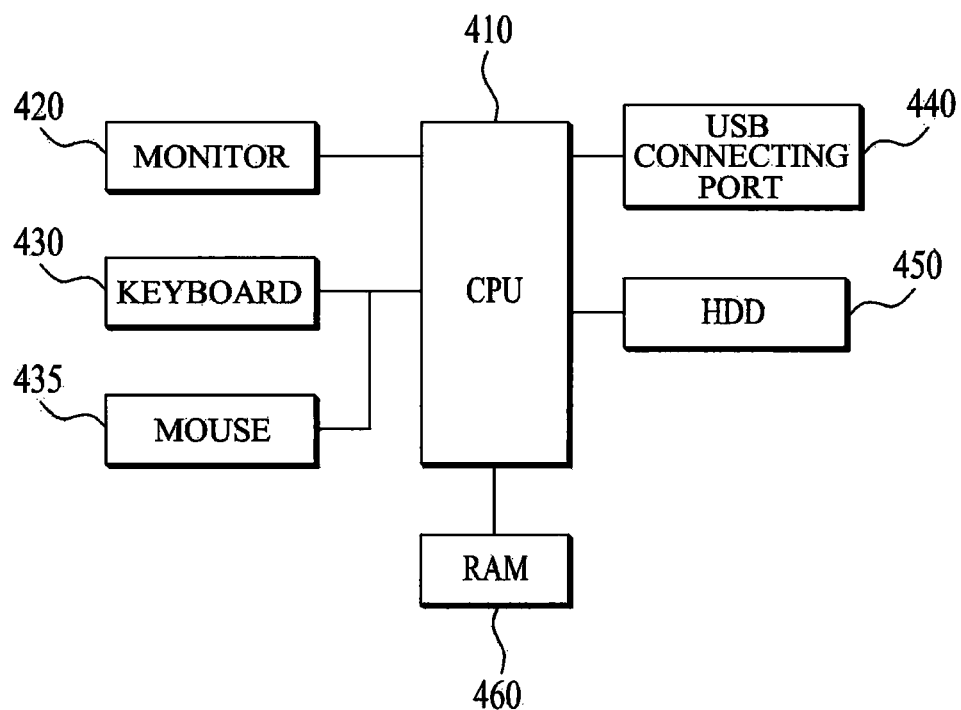
FIG. 6 is a view showing the configurations of a computer applied with a USB host unit of FIG. 5 according to the embodiment of the present invention.

FIG. 6 is a view showing the configurations of a computer applied with the USB host unit of FIG. 5 according to the embodiment of the present invention.

As shown, the computer applied with the USB host unit 300 of the present invention may include a CPU 410, a monitor 420, a keyboard 435, a USB connecting port 440, a hard disk drive (HDD) 450, and a RAM 460.

At this time, in terms of technical features, the CPU 410 is corresponded to the host controller 310, the monitor 420 is corresponded to the output interface 320, the keyboard 430 and a mouse 435 are corresponded to the input interface 330, the USB connecting port 440 are corresponded to the USB connecting port 340, and the hard disk drive (HDD) 450 is corresponded to the storage unit 350.

Like this, according to the embodiment of the present invention, generation and encryption of the security USB storage medium may be performed by the computer corresponding to the USB host unit 300.

INDUSTRIAL APPLICABILITY

The invention may widely be applied to a portable storage medium field including the USB storage medium having enhanced data security functions capable of supplementing security vulnerability problems for the data stored in the storage medium.

Although the preferred embodiments of the present invention are shown and described above, the present invention is not limited to the above-described specific embodiments and may be variously modified by one skilled in the art such that the modified embodiment is not to be understood separately from technical ideas or views of the present invention.

The invention claimed is:

1. A method for managing a security Universal Serial Bus (USB) storage medium for managing a security of a USB storage medium including a USB interface, comprising:
generating a security USB storage medium; and
restoring a security volume header of a destroyed security USB storage medium within the generated security USB storage medium;
wherein generating the security USB storage medium includes,
requesting a first input of user password to a user by an agent program mounted in a USB host unit or the USB storage medium, when the USB storage medium is coupled with the USB host unit;
generating a random key and a disk key for encrypting and decrypting a security volume body part of the USB storage medium, by the agent program, when the first user password is input;
generating first encryption and decryption keys by hashing the first user password and the random key, by the agent program; and
generating a security volume header by encrypting a header of the USB storage medium using the first encryption and decryption keys and an encryption algorithm and storing into a storage unit together with the random key, and generating the security volume body part by encrypting a body part of the USB storage medium using the disk key and the encryption algorithm, by the agent program, and
restoring the security volume header of the security USB storage medium
searching the security volume header to be restored according to a restoring request, when the security USB storage medium is coupled with the USB host unit and then the restoring request of the security volume header of the security USB storage medium is received from the user, by the agent program;
requesting a fourth input of user password to the user, when the security volume header is searched;
encrypting and decrypting, by fourth generating keys, the security volume header using the input fourth user password and the random key stored in the security volume header in the storage unit;
decrypting the security volume header using the generated fourth encryption and decryption keys; and
recording predetermined data stored in the security volume header in a header region of the destroyed security USB storage medium, when the security volume header is decrypted.

2. The method for managing the security USB storage medium according to claim 1, wherein, in generating of the security volume body part, random data recorded in the USB storage medium body part is encrypted and generated by a sector as a unit through a sector Input/Output (I/O) driver.

3. The method for managing the security USB storage medium according to claim 1, wherein the predetermined data including the random key and the disk key is stored into the header of the USB storage medium, and the agent program encrypts data except for the random key among the data stored in the header.

4. The method for managing the security USB storage medium according to claim 3, further comprising, after generating the security USB storage medium, the method allowing the agent program to perform mounting the security USB storage medium including:
requesting an input of a second user password to a user, when the security USB storage medium is coupled with the USB host unit;
generating second encryption and decryption keys for encrypting and decrypting the security volume header using the input second user password and the random key stored in the security volume header of the security USB storage medium, when the second user password is input;
decrypting the security volume header using the generated second encryption and decryption keys; and
extracting the disk key stored in the security volume header and mounting the extracted disk key in the security volume body part, when the security volume header is decrypted.

5. The method for managing the security USB storage medium according to claim 4, mounting the security volume body part further includes decrypting a specific sector for the USB storage medium body part or the data stored in an entire sector through a sector Input/Output (I/O) driver, by the agent program.

6. The method for managing the security USB storage medium according to claim 3, further comprising, after generating the security USB storage medium, the method allowing the agent program to perform destroying the security USB storage medium including:
  requesting an input of a third user password to a user, when the security USB storage medium is coupled with the USB host unit;
  encrypting and decrypting, by third generating keys, the security volume header using the input third user password and the random key stored in the security volume header of the security USB storage medium, when the third user password is input;
  decrypting the security volume header using the generated third encryption and decryption keys; and
  overwriting random values to data in the security volume, when the security volume header is not decrypted.

7. The method for managing the security USB storage medium according to claim 3, further comprising, after generating the security USB storage medium, the method allowing the agent program to perform destroying the security volume header of the security USB storage medium including:
  requesting an input of a third user password to a user, when the security USB storage medium is coupled with the USB host unit;
  encrypting and decrypting, by third generating keys, the security volume header using the input third user password and the random key stored in the security volume header of the security USB storage medium, when the third user password is input;
  decrypting the security volume header using the generated third encryption and decryption keys;
  resetting random values to data stored in the security volume header, when the security volume header is not decrypted.

8. The method for managing the security USB storage medium according to claim 1, wherein, in inputting of the first user password, the agent program requests the input of a path of a security volume unit to the user or checks whether a quick format is enabled.

9. The method for managing the security USB storage medium according to claim 1, wherein the USB storage medium is a USB memory stick or a USB external hard drive.

10. The method for managing the security USB storage medium according to claim 9, wherein, generating the security USB storage medium further includes forming a Compact Disc (CD) region mounted with the agent program prior to the requesting of the input of the first user password, when the USB storage medium is a USB memory stick.

11. The method for managing the security USB storage medium according to claim 1, wherein, generating the security USB storage medium further includes inputting and outputting data by a sector and mounting a sector Input/Output (I/O) driver for encrypting and decrypting the data in the USB host unit, prior to the requesting of the input of the first user password.

* * * * *